INVENTOR.
EDWIN R. HIRT
BY Stanley Bialos
ATTORNEY

Oct. 30, 1962     E. R. HIRT     3,061,352
ARTICLE LIFTING DEVICE AND SYSTEM
Filed July 25, 1960     2 Sheets—Sheet 2

INVENTOR.
EDWIN R. HIRT
BY Stanley Bialos
ATTORNEY

United States Patent Office 3,061,352
Patented Oct. 30, 1962

3,061,352
ARTICLE LIFTING DEVICE AND SYSTEM
Edwin R. Hirt, Orinda, Calif., assignor to Food Systems, Inc., Berkeley, Calif., a corporation of California
Filed July 25, 1960, Ser. No. 45,214
10 Claims. (Cl. 294—65)

This invention relates to a device and system for lifting and transporting objects generally of the same type but which may vary slightly in size and configuration, and more particularly to a device and system for the lifting, transporting, and depositing eggs or the like.

Lifting devices of such character are commonly employed for the lifting of eggs from flats or layers which are commonly packaged in wood boxes or paperboard cartons, and comprise a carrier frame having a suction chamber therein in communication with a plurality of suction cups engageable with the eggs. When a vacuum is applied to the chamber and the cups are lightly pressed into engagement with the eggs, they lift the same; the carrier being provided with a handle to enable transportation to a desired location at which the eggs are released upon disruption of the vacuum. A device of this general character is illustrated in Jackson Patent No. 2,798,757, dated July 9, 1957.

Summarizing this invention, it has as its objects, among others, the provision of an improved device and system of the character related wherein the parts are so arranged as to enable ready detachment thereof for cleaning when so desired; which is provided with a handle for manually transporting the device and having a suction control valve accessible at a side of the handle so that it can be manipulated by a thumb of one hand while the same hand grasps the handle, thereby obviating inadvertent operation of the valve which might otherwise occur with a valve manipulatable at the top of the handle; wherein the valve arrangement is such that a plurality of such devices can be connected to a common vacuum source and the vacuum on any of the devices can be disrupted without interrupting the vacuum maintained on the other of such devices; and which is of simple, economical and sanitary construction.

Referring to the drawings for a more detailed description,

Figure 1:
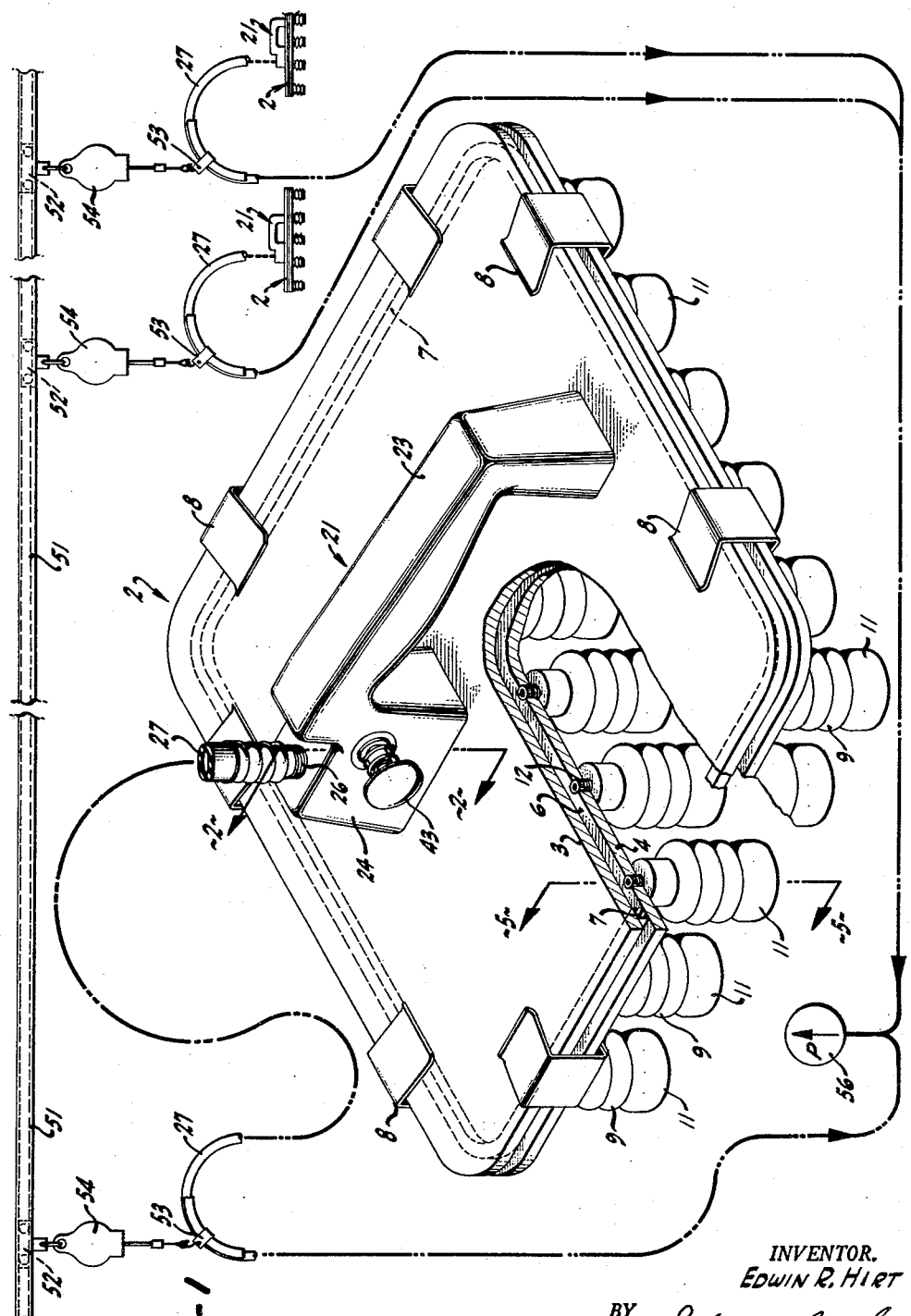
FIG. 1 is an isometric view of the carrier device with a portion thereof shown broken away to illustrate more clearly the construction, and also illustrating schematically the manner in which a plurality of such devices is mounted and connected to a single common vacuum source.
Figure 2:
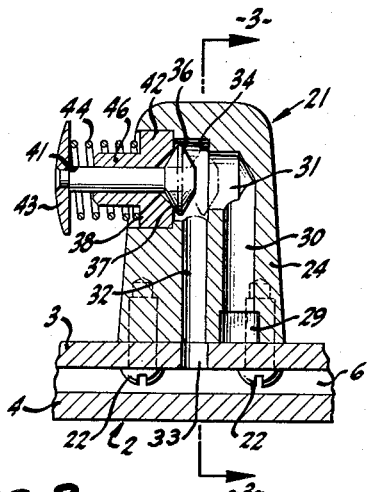
FIG. 2 is a vertical section taken in a plane indicated by line 2—2 in FIG. 1.
Figure 4:
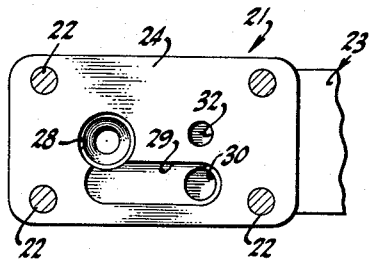
FIG. 4 is a bottom plan view taken in a plane indicated by the line 4—4 in FIG. 3.
Figure 3:
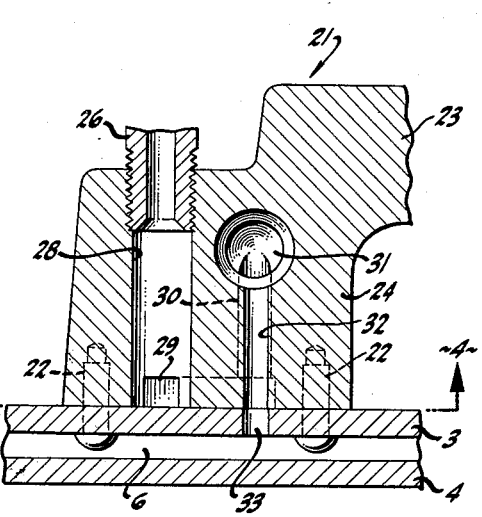
FIG. 3 is a vertical section taken in a plane indicated by line 3—3 in FIG. 2.
Figure 5:
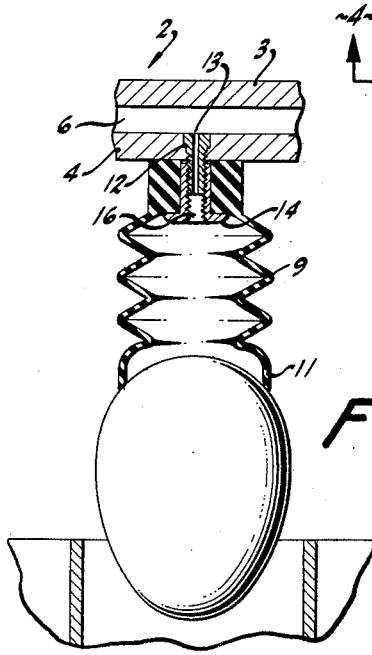
FIG. 5 is a vertical section taken in a plane indicated by line 5—5 in FIG. 1.

A carrier frame 2 is provided comprising a pair of congruently shaped generally rectangular plates which for reference purposes are designated as an upper plate 3 and a lower plate 4. The plates are desirably made of any suitable light transmitting plastic material, such as Plexiglas. A vacuum or suction chamber 6 is provided interiorly between the plates by means of a suitable sealing gasket 7 which extends completely around the plates adjacent the periphery thereof; the gasket may be formed of rubber but desirably synthetic rubber such as neoprene which is oil resistant. To enable ready disassembly of the plates, gasket 7 is unsecured to at least one of the plates but is desirably secured by suitable adhesive to the other plate. Preferably, such securing of the gasket is to the upper plate 3; and the plates are held together and clamped against the gasket by a plurality of spaced apart metal spring clamps 8 about the periphery of the plates. When a vacuum is applied to chamber 6, the plates become tightly sealed against gasket 7. Desirably, the clamps are made of chrome plated metal to facilitate cleaning thereof.

The clamps can be readily removed by sliding them off the plates; and when so removed, plate 4 to which the gasket is unsecured, can be easily freed from the gasket to permit cleaning of the inside surfaces of the plates when this is required. In this connection, it is desirable to have the gasket secured to at least one of the plates so that it will always be in position, and not require refitting when the plates are secured together again by the clamps, although the gasket could be unsecured to both plates if so desired but then when the plates are disassembled, the gasket would have to be refitted in proper position between the plates.

Figure 6:
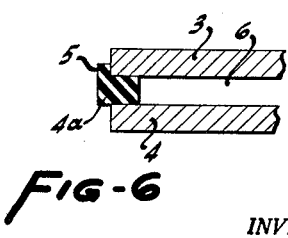
FIG. 6 is a fragmentary vertical sectional view illustrating a sealing gasket modification.

FIG. 6 illustrates an embodiment wherein the gasket is not adhesively secured to either plate but is secured to one plate by being gripped thereto but is still unsecured to the other plate. Plates 3 and 4 are of the same character previously described and gasket 4a is of the same material. It is formed with a flange positioned between plates 3 and 4 and with an integral peripheral upright flange or lip 5 which grips the edge of upper plate 3. When disassembled, gasket 4a remains attached to plate 3 by virtue of the gripping action of lip 5. The gasket can be removed for cleaning when so desired; and when reassembled it can be reattached to either plate 3 or 4 as such plates are of the same size and shape. Since gasket 4a is not secured by adhesive, there is no necessity of having to apply fresh adhesive should the gasket of FIG. 1 become loose.

In use, vacuum is applied to chamber 6 by means to be described; and lifting suction cups 9 are secured to the lower plate 4 in communication with the chamber. These suction cups are desirably of the bellows type of the general character described in the aforementioned patent and which are made of relatively thin resilient material, such as rubber or neoprene having a readily flexible cup or lip portion 11 adapted to engage an egg; the number and spacing of suction cups on the device corresponding to that commonly employed in the positioning of eggs on an egg flat or the like.

Suction cups 9 are mounted for quick detachable connection to plate 4 carrying the same to facilitate detachment thereof for cleaning when necessary. For this purpose, a male screw 12 is provided for each cup and is rigidly secured in lower plate 4; the screw being desirably of aluminum alloy press fitted into the plate, and having a relatively narrow internal passage 13 therein communicating with chamber 6. The upper end of each suction cup is relatively thick and is fixedly secured about a female screw 14 desirably of brass, adapted to be threatened onto male screw 12; the female screw having a passage 16 in communication with the interior of the cup and with passage 13. Thus, the cups can be readily removed from or secured to plate 4 of the carrier at the outer side of plate 4, which facilitates cleaning if so desired without disassembling plates 3 and 4.

Means is provided for enabling manual transportation of carrier frame 2 from one place to another while it is carrying the eggs, comprising a handle 21 detachably secured to upper plate 3 by cap screws 22. Handle 21 is desirably of chromium plate cast aluminum alloy, and has a hand grip portion 23, and at one end a valve housing portion 24. Such valve housing portion has an internal suction passageway in communication with chamber 6 and with an upright nipple 26 connected to a flexible hose or conduit 27 in turn connected to a source of vacuum. Such passageway in the handle comprises upright passage 28 communicating at its upper end with nipple 26 and its lower end with a slot 29 cut out on the underside of the valve housing portion 24 and which is sealed by plate 3. Slot 29 communicates with a second upright passage 30 leading to a laterally facing valve seat chamber 31 in communication with a third upright passage 32 in turn communicating with port 33 in upper plate 3.

Chamber 31 terminates in a laterally facing valve seat 34. A two-way valve 36 is mounted for movement along an axis transverse to or laterally of the plane of handle 21 between valve seat 34 and a valve seat 37 formed on the inside of a side wall of valve housing portion 24; the valve seat communicating with a bleeder passage 38 which is in communication with the atmosphere. When valve 36 closes valve seat 37, suction applied to hose 27 will be effective on the suction cups 9 but when the valve is moved to open bleeder passage 38 and close valve seat 34, the vacuum maintained on the suction cups will be interrupted.

Means is provided for normally maintaining bleeder passage 38 closed but which is manually operable to open the bleeder passage and close the main suction passageway 28—32, comprising a valve stem 41 which carries the two-way valve 36, and is slidably mounted for lateral movement in such side wall of housing portion 24. The valve and stem are desirably of brass. For facilitating cleaning, valve stem 41 is slidable in a suitable self lubricating plastic insert 42 press fitted into the housing side wall and upon which the valve seat 37 is formed; the desirable plastic being "Teflon" by Du Pont, which is a fluorine-substituted polyethylene specifically polytetrafluoroethylene.

The valve stem extends laterally beyond a side wall of housing portion 24; and at its outer end it carries a metal button 43 which can be depressed by the thumb of one hand while the hand is gripping hand grip 23 of the handle. Resilient means in the form of coil spring 44 above the valve stem is interposed between button 43 and the outer face of the insert to urge normally valve 36 against valve seat 37 and thus normally close the bleeder passage 38; a centering boss 46 being provided on the insert for centering spring 44. Since button 43 is manipulatable at a side of the handle, there is less danger of accidentally depressing the same than when the button is depressible at the top of the handle.

The preferred material of plastic insert 42 is sufficiently resilient and deformable so that the insert and the valve assembly carried thereby can be readily positioned on valve housing portion 24 and removed therefrom as a unit for cleaning when desired.

From the preceding, it is seen that a vacuum can be continually maintained at a source of vacuum and that while the source of the vacuum is maintained, release of articles carried by the suction cups can be effected by opening the bleeder passage 38 against the action of resilient means 44, and closing the main suction passageway 28—32 to interrupt the vacuum applied to chamber 6 and allow atmospheric air to bleed into the chamber through passage 38.

Such arrangement allows a plurality of the carrier devices to be connected to a single source of vacuum so that any device can be manipulated individually without interrupting the vacuum maintained on any other of such devices. This is important when it is considered that in commercial egg handling operations, it is desirable that a plurality of workmen manipulate a plurality of the devices at one time.

FIG. 1 illustrates schematically such arrangement which comprises a track 51 which slidably carries a plurality of carriages 52. The suction hose 27 of each device is secured to a clamp 53 which is carried at the lower end of a conventional spring counterbalancing unit 54 in turn connected to a slidable carriage 52; all of the hoses 27 being connected to the common vacuum source 56. Hence, should a workman be transporting eggs with one of the devices upon which the suction is maintained, another workman can be releasing the suction on another device to deposit eggs where desired without interrupting the suction maintained on the device carrying the eggs.

Occasionally, an egg may be broken as it is engaged by a suction cup, and should this occur, the egg contents would naturally be drawn into chamber 6 of the device thus necessitating cleaning. Because of the described construction, such cleaning can be effected very quickly merely by unscrewing the fouled suction cup, removing the clamps 8 to allow disassembly of plates 3 and 4. This renders the handle 21 readily removable by unscrewing cap screws 22 from upper plate 3. Also, since the valve mechanism is carried by removable insert 42, such entire mechanism can be removed as a unit to facilitate cleaning thereof.

I claim:

1. A device for lifting and transporting a plurality of eggs or the like comprising an upper plate and a lower plate, a sealing gasket between the plates spacing them apart and providing a chamber therebetween, said gasket being unsecured to at least one of said plates whereby the plates can be readily disassembled, spring clamping means over the edges of said plates and resiliently engaging the top and bottom surfaces of said plates to provide the means detachably securing them together and clamping said gasket therebetween, a plurality of lifting suction cups secured to the lower plate and in communication with said chamber, a handle secured to the upper plate and having a valve housing provided with a passageway in communication with said chamber and with means on said housing for connection to a vacuum source, said housing having a bleeder passage communicating with said passageway and with the atmosphere, and a valve mounted on said housing and normally closing said bleeder passage.

2. A device for lifting and transporting a plurality of eggs or the like comprising an upper plate and a lower plate, a sealing gasket between the plates spacing them apart and providing a chamber therebetween, said gasket being unsecured to at least one of said plates whereby the plates can be readily disassembled, spring clamping means over the edges of said plates and resiliently engaging the top and bottom surfaces of said plates to provide the means detachably securing them together and clamping said gasket therebetween, a plurality of lifting suction cups secured to the lower plate and in communication with said chamber, a handle secured to the upper plate and having a valve housing provided with a passageway in communication with said chamber and with means on said housing for connection to a vacuum source, said housing having a bleeder passage communicating with said passageway and with the atmosphere, and a spring pressed valve carried by a valve stem slidably mounted in a side wall of the housing and normally closing said bleeder passage, said valve stem extending transversely with respect to the lengthwise direction of the handle below the top thereof and beyond said side wall whereby it may be depressed by the thumb of one hand to open said bleeder passage while said hand is gripping the handle.

3. The device of claim 2 wherein said bleeder passage is in a removable insert and said valve stem is slidably mounted in said insert to facilitate cleaning of such parts.

4. In a device for lifting and transporting a plurality of eggs or the like comprising a pair of plates; a sealing gasket between the plates spacing them apart and providing a chamber therebetween, said gasket being unsecured to at least one of said plates whereby the plates can be readily disassembled, and spring clamping means over the edges of said plates and resiliently engaging the top and bottom surfaces of said plates to provide the means detachably securing them together and clamping the gasket therebetween.

5. A device for lifting and transporting a plurality of eggs or the like, comprising a carrier frame having an interior chamber, means at one side of the frame for supporting a plurality of lifting suction cups in communication with said chamber, a handle secured to an opposite side of said frame and having a valve housing provided with a passageway in communication with said chamber and with means on said housing for connection to a vacuum source, said housing having a bleeder passage communicating with said passageway and with the atmosphere, a two way valve movably mounted in said housing from a position closing said bleeder passage to a position closing said passageway and vice versa, resilient means normally urging said valve to a position closing said bleeder passage, and a valve stem slidably mounted on said housing and carrying said valve, said stem extending transversely with respect to the lengthwise direction of the handle below the top thereof and beyond a side wall of the housing whereby it can be manually depressed against the action of said resilient means to open the bleeder passage and close said passageway.

6. A device for lifting and transporting a plurality of eggs or the like, comprising a frame having an interior chamber, means at one side of the frame for supporting a plurality of lifting suction cups in communication with said chamber, a handle secured to an opposite side of said frame and having a valve housing provided with a passageway in communication with said chamber and with means on said housing for connection to a vacuum source, said housing having a bleeder passage communicating with said passageway and with the atmosphere, a two way valve movably mounted in said housing from a position closing said bleeder passage to a position closing said passageway and vice versa, a valve stem slidably mounted on said housing and carrying said valve, said valve stem extending transversely with respect to the lengthwise direction of the handle below the top thereof and laterally beyond a side wall of said housing whereby it may be depressed by the thumb of one hand while the hand is gripping the handle, and resilient means about said valve stem exteriorly of the housing normally urging said valve to a position closing said bleeder passage; said valve, valve stem and resilient means being carried by an insert removably mounted on said housing to facilitate cleaning of such parts.

7. The device of claim 6 wherein said valve, valve stem, and resilient means are carried by an insert removably mounted on said housing.

8. In a device for lifting and transporting a plurality of eggs or the like comprising an upper plate and a lower plate, a sealing gasket having a first flange between the plates adjacent the edges thereof spacing them apart and providing a chamber therebetween, said gasket having an upright peripheral flange integral with said first flange and gripping the edge of one of said plates thereby detachably securing said gasket to said plate, and spring clamping means over the edges of said plates and resiliently engaging the top and bottom surfaces of said plates to provide the means detachably securing them together and clamping said first gasket flange therebetween whereby the plates and the gasket can be quickly disassembled for cleaning and quickly reassembled.

9. A device for lifting and transporting a plurality of eggs or the like comprising an upper plate and a lower plate, a sealing gasket having a first flange between the plates adjacent the edges thereof spacing them apart and providing a chamber therebetween, said gasket having an upright peripheral flange integral with said first flange and gripping the edge of one of said plates thereby detachably securing said gasket to said plate, spring clamping means over the edges of said plates and resiliently engaging the top and bottom surfaces of said plates to provide the means detachably securing them together and clamping said first gasket flange therebetween whereby the plates and the gasket can be quickly disassembled for cleaning and quickly reassembled, a handle secured to the upper plate and having a valve housing provided with a passageway in communication with said chamber and with means for connection to a vacuum source, an insert removably mounted in a side wall of said housing below the top of said handle and having a bleeder passage communicating with said passageway and with the atmosphere, a valve stem slidably mounted in said insert and extending transversely with respect to the lengthwise direction of said handle below the top thereof and beyond said side wall, a valve member carried by the inner end of said stem, a button carried by the outer end of said stem adjacent said side wall, and a coil spring about said valve stem exteriorly of said passageway and interposed between said insert and said button for normally urging said valve member to a position closing said bleeder passage but manually depressible by the thumb of one hand to open said bleeder passage and close said passageway.

10. In a device for lifting and transporting a plurality of eggs or the like comprising an upper plate and a lower plate both of which are of light transmitting plastic material, a sealing gasket having a first flange between the plates adjacent the edges thereof spacing them apart and providing a chamber therebetween, said gasket having an upright peripheral flange integral with said first flange and in gripping engagement with the edge of one of said plates about the periphery thereof, and spring clamping means over the edges of said plates and engaging the top and bottom surfaces thereof detachably securing them together and clamping said first flange therebetween whereby the plates and the gasket can be quickly disassembled and reassembled.

References Cited in the file of this patent

UNITED STATES PATENTS

| | | |
|---|---|---|
| 1,526,535 | Eddy | Feb. 17, 1925 |
| 2,003,856 | Gimble | June 4, 1935 |
| 2,779,984 | Bourgeois | Feb. 5, 1957 |
| 2,798,757 | Jackson | July 9, 1957 |
| 2,803,485 | Page et al. | Aug. 20, 1957 |
| 2,840,415 | Morris | June 24, 1958 |
| 2,903,290 | Morris et al. | Sept. 8, 1959 |

FOREIGN PATENTS

| | | |
|---|---|---|
| 26,209 | Finland | Nov. 11, 1953 |